US012548458B2

(12) United States Patent
Nagar et al.

(10) Patent No.: US 12,548,458 B2
(45) Date of Patent: Feb. 10, 2026

(54) COGNITIVE VIDEO SCROLLING VIEWER INTERFACE

(71) Applicant: INTERNATIONAL BUSINESS MACHINES CORPORATION, Armonk, NY (US)

(72) Inventors: Raghuveer Prasad Nagar, Kota (IN); Sarbajit K. Rakshit, Kolkata (IN); Manjit Singh Sodhi, Bangalore (IN); Sidharth Ullal, Chennai (IN)

(73) Assignee: International Business Machines Corporation, Armonk, NY (US)

( * ) Notice: Subject to any disclaimer, the term of this patent is extended or adjusted under 35 U.S.C. 154(b) by 776 days.

(21) Appl. No.: 17/947,229

(22) Filed: Sep. 19, 2022

(65) Prior Publication Data

US 2024/0096231 A1 Mar. 21, 2024

(51) Int. Cl.
*G09B 5/06* (2006.01)
*G06F 3/0354* (2013.01)
*G06F 3/0482* (2013.01)

(52) U.S. Cl.
CPC ......... *G09B 5/065* (2013.01); *G06F 3/03547* (2013.01); *G06F 3/0482* (2013.01)

(58) Field of Classification Search
CPC .... G09B 5/065; G06F 3/0482; G06F 3/03547
See application file for complete search history.

(56) References Cited

U.S. PATENT DOCUMENTS 9,489,580 B2 * 11/2016 Laska .................. G06V 10/235
9,865,308 B2 * 1/2018 Gower .................. G11B 27/34
2004/0128317 A1 * 7/2004 Sull ....................... G06F 16/743
2009/0109178 A1 * 4/2009 Kim ....................... H04N 23/66 348/169
2012/0263430 A1 * 10/2012 Spitzer-Williams ......................... H04N 21/4223 386/E5.069

(Continued)

FOREIGN PATENT DOCUMENTS

CN 106658116 B 5/2017

OTHER PUBLICATIONS

"Building interactive video experiences has never been easier", Rapt Media, Printed from the Internet on Jul. 19, 2022, 7 pages, <https://www.raptmedia.com/product/>.

(Continued)

*Primary Examiner* — Steve Rowland
(74) *Attorney, Agent, or Firm* — Stosch Sabo

(57) ABSTRACT

A system and method are used to record and present a training video for a software component. The method displays the video recording. The video recording comprises: a display element of the software component, and first recorder activity data (FRAD) of recorder user interface (UI) input activity data (RUIIAD) at a FRAD time with video frame data of the video recording. The method further comprises receiving, during the displaying, viewer UI actions from a UI of the viewing device and converting them to viewer UI input activity data based on viewer interactions with the display element of the software component. Then, first viewer activity data (FVAD) is determined at a FVAD time of the video frame that corresponds to the FRAD, where the FRAD time and the FVAD time differ. Responsive to the determining, the method moves the video recording from the FVAD time to the FRAD time.

20 Claims, 5 Drawing Sheets

(56) References Cited

U.S. PATENT DOCUMENTS

| | | | | |
|---|---|---|---|---|
| 2013/0159784 | A1* | 6/2013 | Rossi | G06F 11/3684 714/47.1 |
| 2016/0316256 | A1* | 10/2016 | Laska | G06F 3/04883 |
| 2018/0192146 | A1 | 7/2018 | Lian | |
| 2018/0232592 | A1* | 8/2018 | Stewart | G08B 13/19606 |
| 2020/0366953 | A1 | 11/2020 | Shusman | |
| 2021/0125519 | A1 | 4/2021 | Fang | |
| 2021/0263625 | A1* | 8/2021 | Shi | H04N 21/6582 |
| 2022/0091731 | A1* | 3/2022 | Lewis | H04L 67/75 |
| 2022/0113991 | A1* | 4/2022 | Singh | G06F 9/451 |
| 2023/0297207 | A1* | 9/2023 | Garmon | G08B 13/19613 715/719 |

OTHER PUBLICATIONS

"Create Interactive Videos", Wirewax Interactive Video Platform, Printed from the Internet on Jul. 19, 2022, 17 pages, <https://www.wirewax.com/>.

"The Fastest, Easiest Way to Create Conversations That Convert in 5 Seconds" DilogR, Printed from the Internet on Jul. 19, 2022, 11 pages, <https://dilogr.com/>.

"Video AI—Video Content Analysis", Google Cloud, Printed from the Internet on Jul. 19, 2022, 9 pages, <https://cloud.google.com/video-intelligence>.

Shipman et al., "Generation of Interactive Multi-Level Video Summaries", Proceedings of the Eleventh ACM International Conference on Multimedia, Nov. 2-8, 2003, Berkeley, California, 11 pages, <https://www.researchgate.net/publication/221572093>.

* cited by examiner

COGNITIVE VIDEO SCROLLING VIEWER INTERFACE

BACKGROUND

Disclosed herein is a system and related method for a viewer interface, and, in particular, a cognitive video scrolling viewer interface. Videos often have a horizontal scroll bar that may be used by a viewer to control the video being played. Popular online learning may involve one or more videos, and different types of learning content may be recorded in video—these may be played for video-based learning.

SUMMARY

Disclosed herein is a computer implemented method for producing, by a recorder, a video recording about a software component, using a recording device. The method comprises using a processor for receiving, during a recording operation for training a viewer to operate the software component, video frame data for the video recording of the recorder using a user interface (UI) interacting with the software component. The method further comprises receiving, during the recording operation, recorder UI actions from a UI of the recording device and converting them to recorder UI input activity data (RUIIAD) based on the recorder interactions between the recorder and a display element of the software component. First recorder activity data (FRAD) of the RUIIAD is associated at a FRAD time $RT_1$ with the video frame data of the video recording. Finally, the video recording that comprises the video frame data and the RUIIAD is saved to a recording medium.

Also disclosed herein is a computer-implemented method for presenting, to a viewer, a video recording about a software component, using a viewing device. The method comprises using a processor for displaying, during a viewing operation for training the viewer to operate the software component on a display device, the video recording. The video recording comprises: a display element of the software component, and first recorder activity data (FRAD) of recorder user interface (UI) input activity data (RUIIAD) at a FRAD time $RT_1$ with video frame data of the video recording. The method further comprises receiving, during the displaying, viewer UI actions from a UI of the viewing device and converting them to viewer UI input activity data (VUIIAD) based on viewer interactions between the viewer and the display element of the software component. The method further comprises determining first viewer activity data (FVAD) of the VUIIAD at a FVAD time $VT_1$ of the video frame that corresponds to the FRAD, where the FRAD time $VR_1$ and the FVAD time $VT_1$ differ. Responsive to the determining, the method moves the video recording from the FVAD time $VT_1$ to the FRAD time $RT_1$.

Also disclosed herein is a computer-implemented system that includes a recording device and a viewing device, where the devices comprise memory and processors to implement the above-described methods.

Furthermore, embodiments may take the form of a related computer program product, accessible from a computer-usable or computer-readable medium providing program code for use, by, or in connection, with a computer or any instruction execution system. For the purpose of this description, a computer-usable or computer-readable medium may be any apparatus that may contain a mechanism for storing, communicating, propagating or transporting the program for use, by, or in connection, with the instruction execution system, apparatus, or device.

BRIEF DESCRIPTION OF THE DRAWINGS

Various embodiments are described herein with reference to different subject-matter. In particular, some embodiments may be described with reference to methods, whereas other embodiments may be described with reference to apparatuses and systems. However, a person skilled in the art will gather from the above and the following description that, unless otherwise notified, in addition to any combination of features belonging to one type of subject-matter, also any combination between features relating to different subject-matter, in particular, between features of the methods, and features of the apparatuses and systems, are considered as to be disclosed within this document.

The aspects defined above, and further aspects disclosed herein, are apparent from the examples of one or more embodiments to be described hereinafter and are explained with reference to the examples of the one or more embodiments, but to which the invention is not limited. Various embodiments are described, by way of example only, and with reference to the following drawings.

Figure 1:
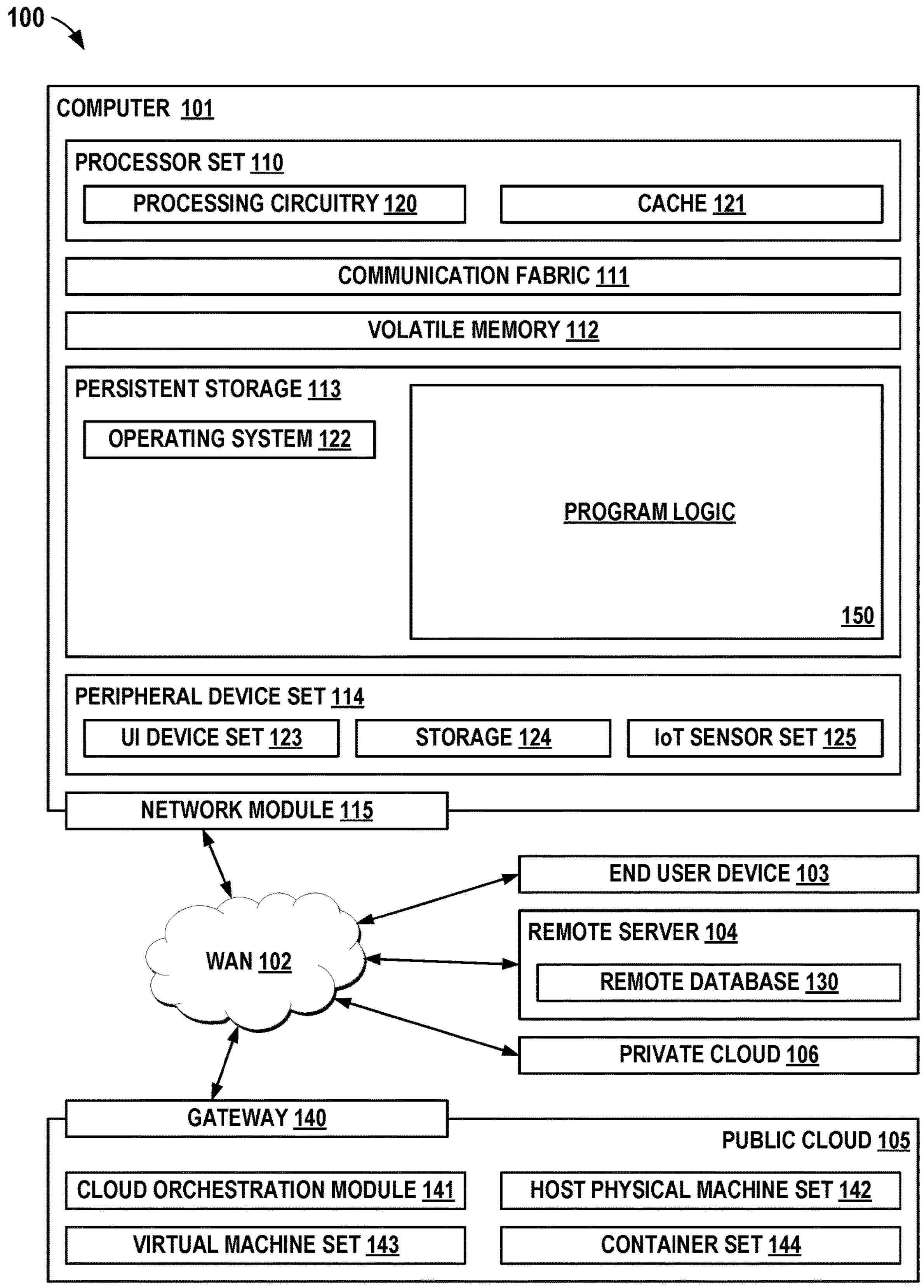
FIG. 1 is a block diagram of a general computing device and environment.

In accordance with common practice, the various described features are not drawn to scale but are drawn to emphasize specific features relevant to the example embodiments.

DETAILED DESCRIPTION

The following general acronyms may be used below:

TABLE 1

| General Acronyms | |
|---|---|
| CD-ROM | compact disc ROM |
| CPP | computer program product |
| DVD | digital versatile disk |
| EPROM | erasable programmable read-only memory |
| EUD | end-user device |
| IoT | Internet of Things |
| LAN | local-area network |
| NFC | near field communication |
| RAM | random access memory |
| ROM | read-only memory |
| SAN | storage area network |

TABLE 1-continued

| General Acronyms | |
|---|---|
| SD | secure digital |
| SDN | software-defined networking |
| SRAM | static random-access memory |
| UI | user interface |
| USB | universal serial bus |
| VCE | virtual computing environment |
| WAN | wide-area network |

General

In the description herein, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

As used herein, "a number of" when used with reference items, means one or more items. For example, "a number of different types of networks" is one or more different types of networks.

Further, the phrases "at least one", "one or more," and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. In other words, "at least one of", "one or more of", and "and/or" mean any combination of items and number of items may be used from the list, but not all of the items in the list are required. The item may be a particular object, a thing, or a category. Additionally, the amount or number of each item in a combination of the listed items need not be the same. For example, in some illustrative examples, "at least one of A, B, and C" may be, for example, without limitation, two of item A; one of item B; and ten of item C; or 0 of item A; four of item B and seven of item C; or other suitable combinations.

Additionally, the term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

Furthermore, the term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Although specific embodiments are illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

Data Processing System in General

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 1 is a block diagram of a general computing device and environment. Computing environment 100 contains an example of an environment for the execution of at least some of the computer code involved in performing the inventive methods, such as the program logic 150. In addition to program logic 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The descriptions of the various embodiments of the present invention are presented for purposes of illustration, but are not intended to be exhaustive or limited to the embodiments disclosed. Many modifications and variations will be apparent to those of ordinary skill in the art without departing from the scope and spirit of the described embodiments. The terminology used herein has been chosen to best explain the principles of the embodiments, the practical application or technical improvement over technologies found in the marketplace, or to enable others of ordinary skill in the art to understand the embodiments disclosed herein.

Cognitive Video Scrolling Viewer Interface

The following application-specific acronyms may be used below:

TABLE 2

| Application-Specific Acronym | |
|---|---|
| FRAD | first recorder activity data |
| FVAD | first viewer activity data |
| RUIIAD | recorder user interface input activity data |
| UI | user interface |
| VAE | video analysis engine |
| VR | virtual reality |
| VUIIAD | viewer user interface activity data |

Figure 2:
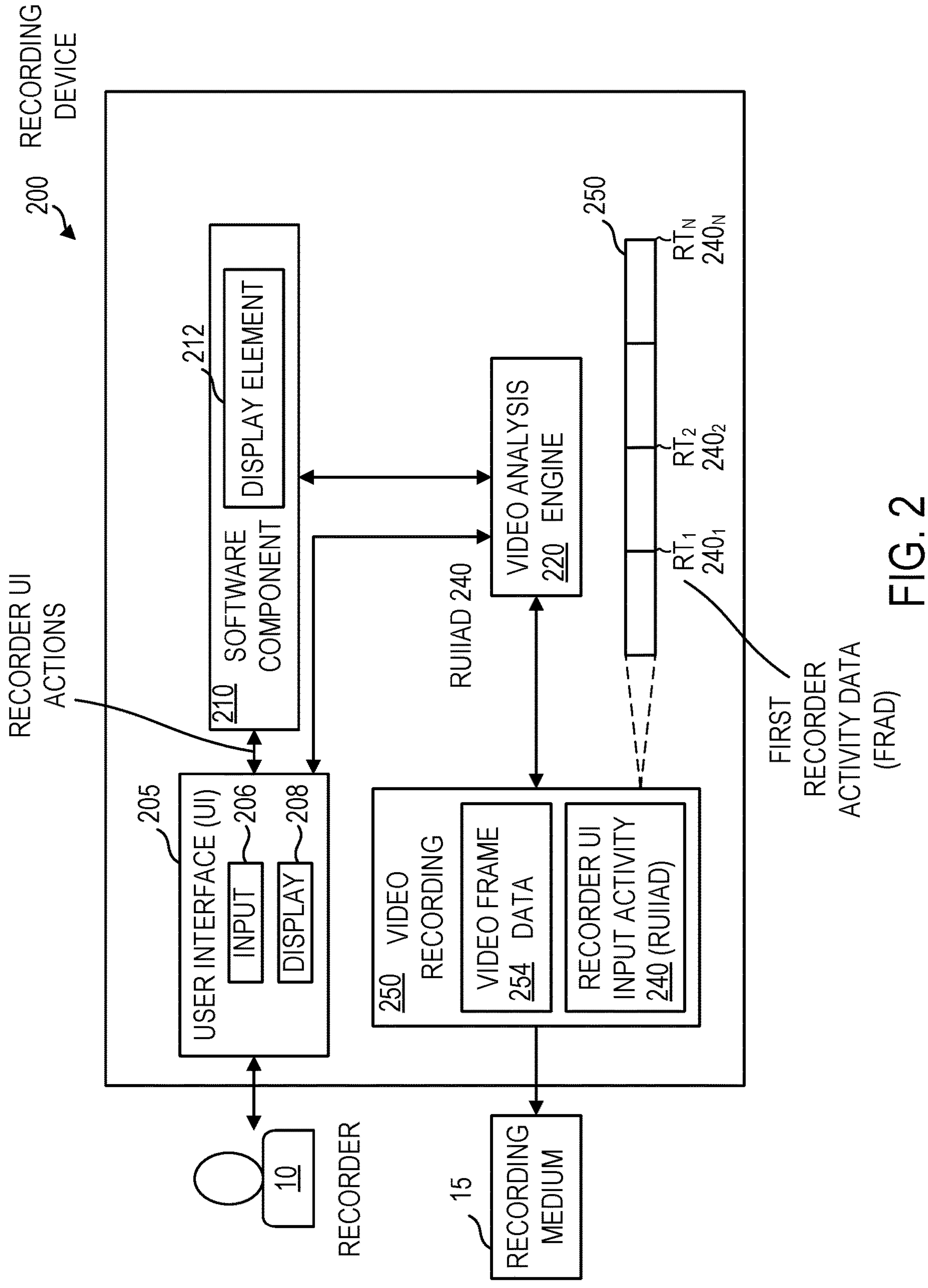
FIG. 2 is a block diagram showing an example according to various embodiments of a recording device.

FIG. 2 is a block diagram showing an example according to various embodiments of a recording device 200, which may be implemented, e.g., on a computer 101 and within a computing environment 100. The recording device 200 may be used to produce software component training videos constituting video recordings 250 that are then stored on a recording medium 15.

Figure 3:
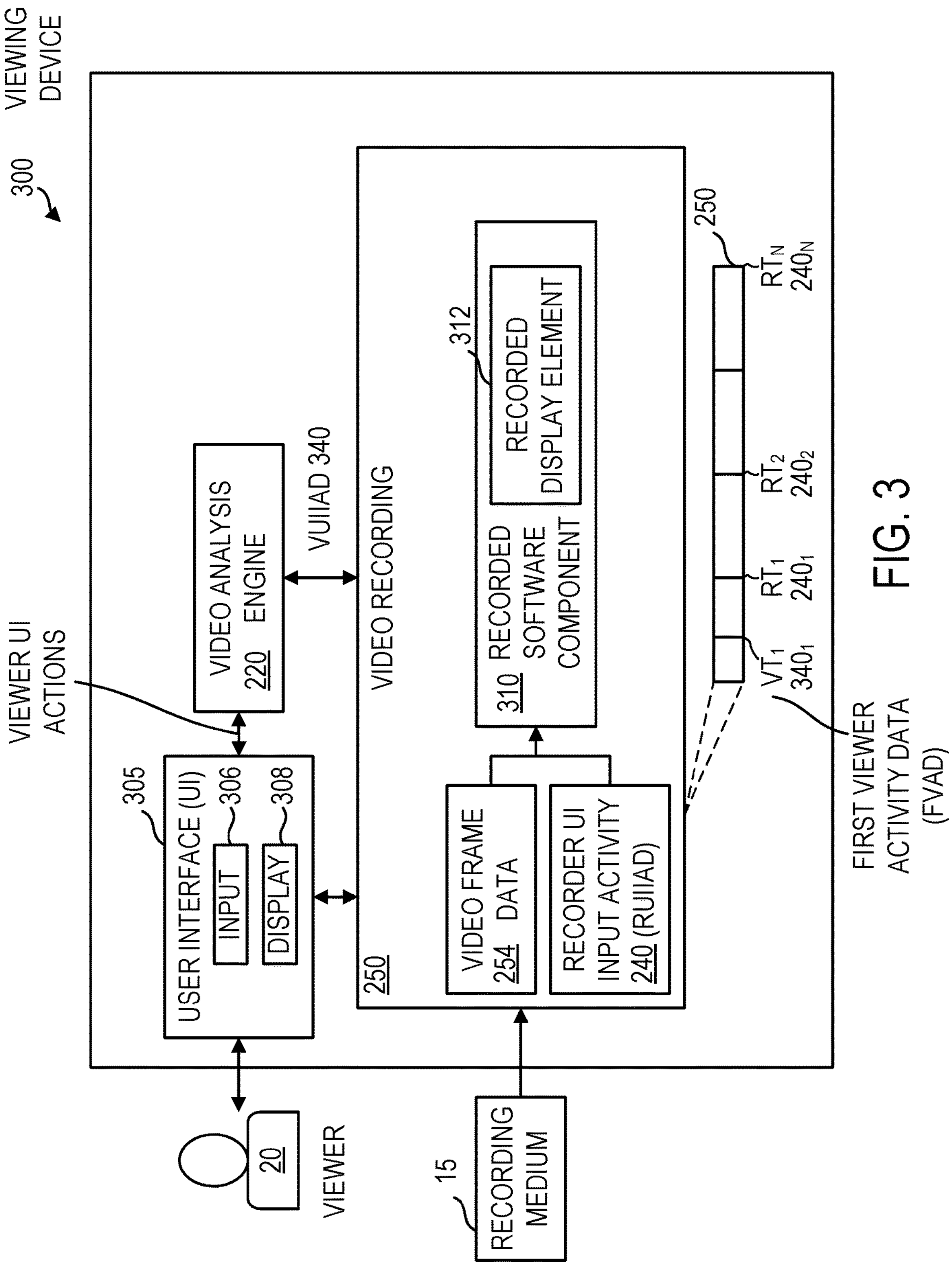
FIG. 3 is a block diagram of the viewing device that the viewer may use to view the video recording stored on the recording medium.

FIG. 3 is a block diagram showing an example according to various embodiments of a viewing device 300, which may also be implemented, e.g., on a computer 101 and within a computing environment 100. The viewing device 300 may be used to present/view the video recordings 250 stored on the recording medium 15 that were produced by the recording device 200.

Figure 4:
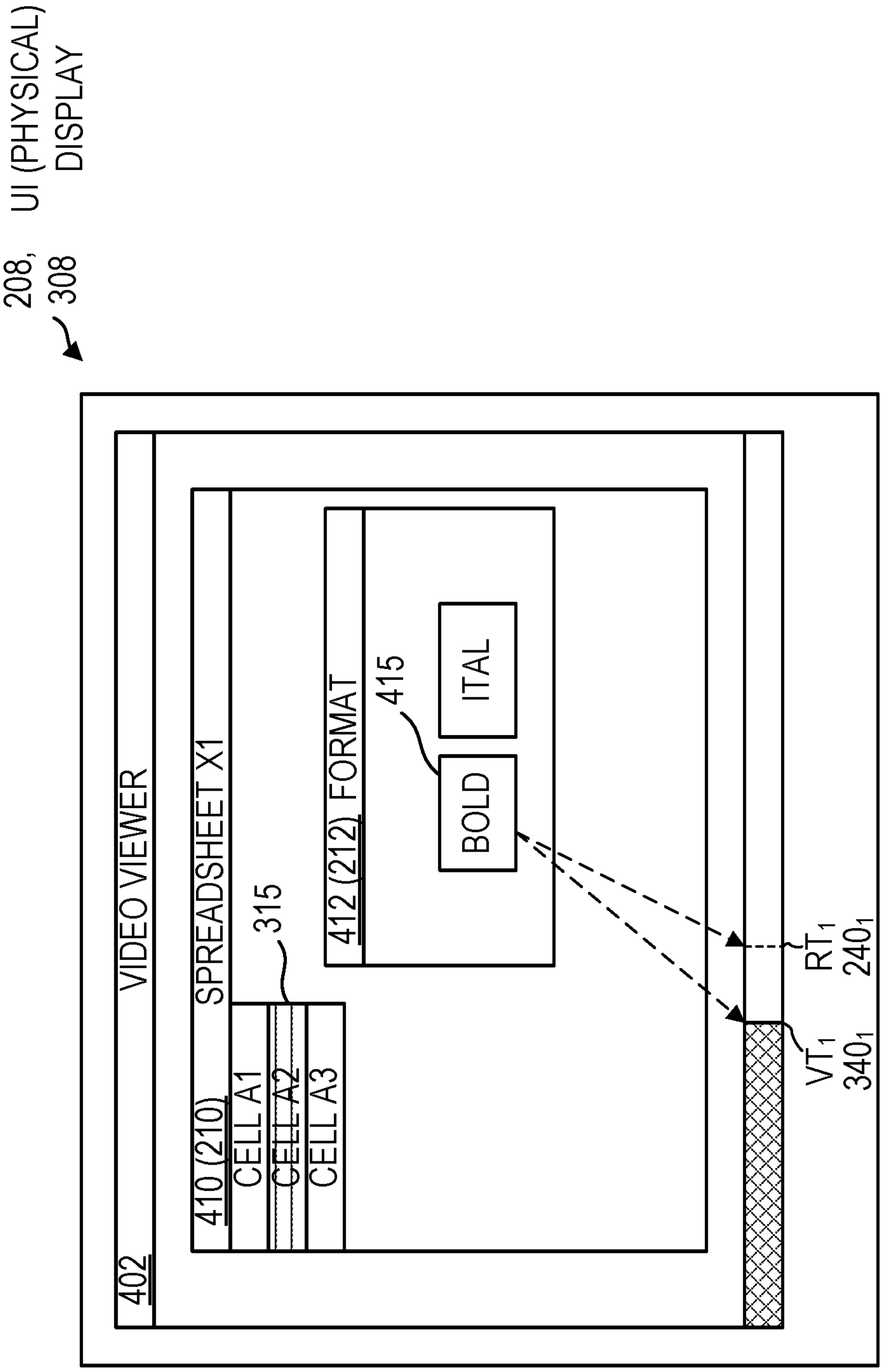
FIG. 4 is a screen shot of a physical display as it displays an example of recorder and viewer interactions with the recorded software component and a video playback of the video recording respectively.

FIG. 4 is a screen shot of a physical display as it displays an example of recorder 10 and viewer 20 interactions with the recorded software component 210 and a video playback of the video recording 250 respectively. For the sake of simplicity, FIG. 4 is used to illustrate the physical display of both the recording device 200 and the viewing device 300. However, there is one significant difference between its illustration of a display for the two devices 200, 300: for the recording device 200, there is no video viewer, and the display of the spreadsheet application and formatting dialog box are created by execution of the actual spreadsheet application itself; for the viewing device 300, the video viewer is present, and the display of the spreadsheet application and formatting dialog box are within the video recording itself. Hence, there is no need for the application software to be present on the viewing device 300. Reference to FIG. 4 will be interleaved with the discussion of FIG. 2, the recording device 200, and the discussion of FIG. 3, the viewing device 300.

In FIG. 2, a user who is a recorder 10 executes a software component 210. In the example application shown in FIG. 4, the software component 210 is a spreadsheet 410. The recorder 10 may interact with the software component 210 via a user interface 250, which may comprise input devices 206 and output devices, such as the display 208. The input devices 206 may include devices such as a keyboard that has keys pressed, a mouse that is moved on a surface and has buttons that pressed for selection and other actions, trackball that is rotated and has buttons that are pressed for selection and other actions, a touch screen that is tapped or has one or more fingers dragged to perform various functions, an eye tracker in a virtual reality (VR) headset where voice or gestures are used to select displayed items, a microphone for audio input, such as voice commands, or any form of pointing device. The output devices may also include a VR headset, monitor, speaker, and the like. In the example application, one input device is a pointing device that is a mouse.

In the example, the recorder 10 is providing a training lesson on using various aspects of the spreadsheet 410. The recorder 10 is recording what is being shown on the display 208 into a video recording 250 that is saved to a non-volatile recording medium 15. In a traditional training video, the video recording 250 would only comprise video frame data 254. However, in various embodiments disclosed herein, data for various recorder activity, the recorder UI input activity data (RUIIAD) 240 (such as the first recorder activity data (FRAD) $RT_1$ $\mathbf{240}_1$) are stored with the video recording 250 as well.

In a focus operation, the recorder 10 is teaching the viewer 20 how to bold the text in a cell. As can be seen in FIG. 4, the spreadsheet 410 has three cells, and a middle cell, cell A1 315 is currently selected, shown as shaded in the FIG. The recorder 10 has initiated a cell formatting function, and a display element 212 in the form of a dialog box 412 appears on the display 208. In the example, and to illustrate various embodiments better, the recorder 10, with the display as shown in FIG. 4, pauses before actually pressing the bold button 415 so that she can explain all of the various format features that are available. This explanation continues for two minutes, and then the recorder 10 finally presses the bold button 415 resulting in the dialog box 412 disappearing and the text within cell A2 315 becomes bolded.

FIG. 2 illustrates the use of a video analysis engine (VAE) 220 that receives, e.g., the user interactions with the display 208 using the input device 206. The VAE 220 may also receive input from (or related to) the display 208 about the software component 210 and any display elements 212 that are being presented by the software component 210 as well as the recorder 10 activities and interactions with the display 208 via one or more input devices 206. The display elements 212 may be, e.g., a dialog box, a menu, a drop-down menu, a list box, a push button, a radio button, a checkbox, and any other display mechanism for soliciting user input. The display elements 212 may comprise any display elements 212 in combination, and may be nested within other display elements 212. For example, and OK pushbutton may be nested within a dialog box and used for confirmation of some activity.

It then converts the data into the RUIIAD 240 and synchronizes it with the video frame data 254. As shown in FIG. 2, a plurality of recorder 10 activities may create different RUIIAD 240 at different times, e.g., $RT_1$ $\mathbf{240}_1$, $RT_2$ $\mathbf{240}_2$, $RT_N$ $\mathbf{240}_N$. The recorder 10 actions may include, for example, selecting from a drop-down list, scrolling, selecting a menu option, etc. The video analysis engine performs post processing of the video being recorded and identifies appropriate frames and the positions where the action is to be created, so that, while watching video, the viewer can also perform the same action.

The VAE 220 may identify a pattern of cursor movement, including, e.g., movement direction, click action, etc., and, accordingly, add data associated with appropriate action on the video recording 250 so that, while watching the video recording 250, the viewer 20 may interact with the displayed software component 210, 310 in a similar manner.

Like cursor and mouse movements, in which the cursor movement pattern is tracked on the screen, the VAE 220 may identify voice commands used by the recorder 10 while the video recording 250 is being created, and, accordingly, adds appropriate action(s) on the video recording 250 so that while watching the video recording 250, the viewer 20 may interact with original content using the same voice commands.

Using the example of FIG. 4, the recorder 10 presses the bold button 415 on the format dialog box 412 (the display element 212), and information about the button press is stored as the FRAD $\mathbf{240}_1$ at time $T_1$, which is associated with time $T_1$ in the video frame data 254. The VAE 220 may determine the X, Y screen coordinates of the input device 206 pointer when a select activity is performed. The VAE 220 may then determine which display element 212 of which software component 210 and which software component activity the select activity corresponds to. For example, the VAE 220 may determine that the X, Y screen coordinates correspond to the bold button 415 of the format dialog box 412 for the spreadsheet 410. In some embodiments, the X, Y coordinates may be relative to various display elements 212 of the software component 210.

The VAE 220 may also identify a previous video frame of the video frame data 254 to find what action is performed by the positioning input device 206, e.g., a mouse pointer, which has changed the video content. In various embodiments, the VAE 220 may identify the relative position of the mouse pointer with respect to a particular recorded video frame, and may identify a location on the video frame where the mouse action is performed.

In various embodiments, the VAE 220 may also track the pointer device movement pattern and pattern of change in a video frame of the video frame data 254. The VAE 220 may identify actions, position of the action on the video frame, and the same action will be considered as an overlaid action, creating the RUIIAD 240 data. The VAE 220 may identify the video frames where the change in the video content is present, and may identify an appropriate action and the position of the scroll bar.

The video recording 250 may have frame identified actions assigned on different portions of the video frames of the video frame data 254. In some embodiments, the VAE 220 overlays actions on exact positions of the frames, on a recognized object. The VAE 220 may identify an object boundary where the recorder 10 action was performed. In some embodiments, the VAE 220 may overlay the identified actions on the frame and the actions may be transparent.

Upon completion, the video recording 250 may be stored in the recording medium 15 where it may be accessed by the viewer.

FIG. 3 is a block diagram of the viewing device 300 that the viewer 20 may use to view the video recording 250 stored on the recording medium 15. In some embodiments, while the video recording 250 is being playing, the viewer 20 may play the video recording 250 as per normal playing of the video, and may control the video recording 250 via the scroll bar.

However, in the novel viewing device 300, while watching the video recording 250, the viewer 20 may use the positioning device on the video content while it is being played.

The video viewer 402 may identify where the viewer 20 has performed their action. In this case, the touch screen enabled device may identify the touch position on the display 308 where the viewer tapped the display 308. The VAE 220 may send information to the video viewer 402, and the VAE 220 may map the position where the touch action is performed. Based on the touch or mouse action on the video content, the VAE 220 may control the movement of the video scroll bar. Based on the viewer's 20 action on the video screen that is being played or based on voice commands of the viewer 20 that match the voice commands of the recorder 10, the video scroll bar may dynamically be changed to the appropriate position. For matching voice commands, any known voice recognition software or hardware may be used.

In more detail, the video recording 250 contains both the RUIIAD 240 and the video frame data 254 that was created by the recorder 10. As noted above, instead of the viewer 20 interacting with the actual software component 210 and display element 212 as the recorder 10 did, the viewer 20 interacts with the recorded software component 310 and the recorded display element 312.

The VAE 220 now takes on a different role with the viewing device 300 than it had with respect to the recording device 200. Although FIG. 2 and FIG. 3 show the VAE 220 as being the same and using the same reference number, they could actually be two separate components that operate in a different way, depending on whether it is a recording device VAE or a viewing device VAE. On the viewing device, the VAE 220 reads the data from the video recording 250 instead of writing to it. The VAE 220 also receives user input device 306 activity as the viewer 20 interacts with the display 308 and creates viewer UI activity data (VUIIAD) 340, which may be similar to the RUIIAD 240. The input device 306 may constitute similar devices to recording devices 200 input devices 206. In this case, however, the VUIIAD 340 is coordinated with what is being displayed on the video viewer 402, and not what is being produced by execution of the software component 210 itself. As noted above, the viewing device 300 need not have the actual software component 210 installed to view the video recording 250.

As shown in the example of FIG. 4, the viewer 20 is watching the video recording 250 on their display 308 within a video viewer application 402, which shows the recorded software component 310, i.e., the recorded spreadsheet 410, and the recorded display element 312, i.e., the recorded format dialog box 412. As the viewer 20 watches the video recording 250, he realizes that the recorder 10 is going to discuss each and every format option available for formatting a cell. Since the viewer 20 is only interested in seeing the bolding operation, the viewer 20 wishes to skip the other two minutes of dialog on the video recording and skip directly to the point at which the bold button 415 is selected.

In this case, the viewer 20 clicks the mouse pointer on the bold button 415, just as the recorder 10 did when interacting with the spreadsheet 410. In a conventional viewing device, such a mouse click would have had no effect, since a select on a pointing device within an area of video display conventionally has no effect. The viewer 20 is not able to perform the actions performed by the recorder 10, e.g., the viewer cannot click on the dialog box button but must simply watch the recorder 10 run through various other activities. In this situation for a conventional viewing device, if the viewer 20 wants to see the effect of pressing the button, the viewer must scroll through the video until the recorder 10 presses the button. While watching the video, the viewer is not be able to perform the actions of the recorder on the displayed content. For the viewer, only the scroll bar associated with the video view display of the video recording is available.

However, in various embodiments disclosed herein, the VAE 220, is able to create a VUIIAD element (first viewer activity data FVAD) $VT_1$ $340_1$ by selecting the bold button 415 within the video recording 250. The VAE 220 is able to coordinate this selection information, i.e., using screen or application X, Y coordinates with a similar activity within the RUIIAD 240.

In other words, the FVAD $VT_1$ $340_1$ information is determined to be similar to the FRAD $RT_1$ $240_1$ information (based on coordinates and higher-level information, such that both correspond to selection of a bold button 415 within a format 412 dialog box). Based on this similarity determination by the VAE 220, the VAE 220 may advance the viewing position of the video recording 250 to a point at which the similar activity during recording took place (i.e., of the FRAD $RT_1$ $240_1$). In this way, the viewer 20 may jump or advance directly to a position (of the FRAD $RT_1$ $240_1$) in the video recording 250 in which the viewer's action would have taken them if they were interacting with the actual software component 210. Thus, the viewer 20 does not have to watch portions of the video recording 250 that are unimportant to him. Advantageously, according to various embodiments disclosed herein, the viewer 20 may perform the same actions upon viewing the recorded video 250 as the recorder 10 performed while creating the video recording 250.

Such viewer 20 activities could be matched with any of the RUIIAD events ($RT_2$ 240$_2$, $RT_N$ 240$_N$). If there is no matching RUIIAD events, the VAE 220 could simply ignore the viewer 20 activities, or, alternately, could provide some form of indication that no activity (or corresponding RUIIAD) for a particular interaction was recorded.

Figure 5:
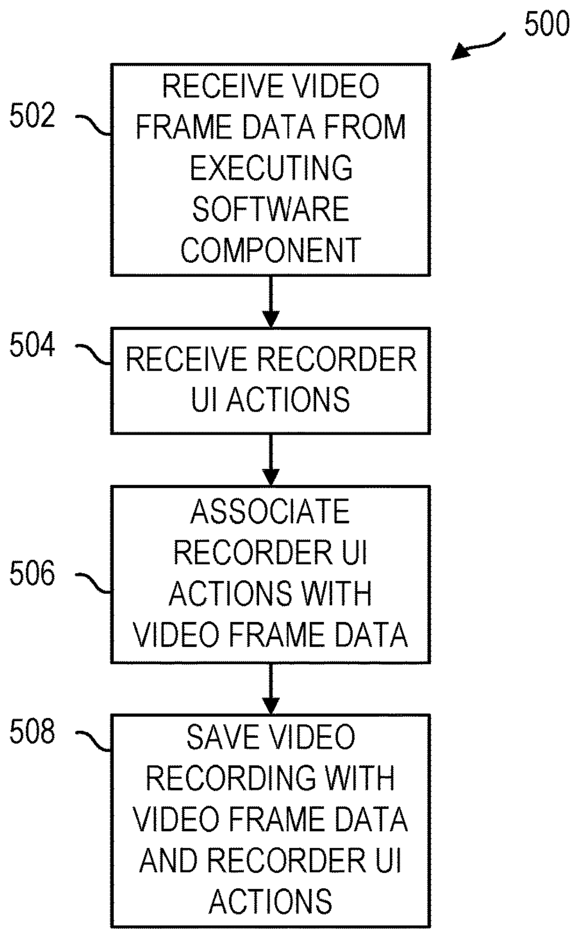
FIG. 5 is a flowchart of an example video recording process in accordance with some embodiments described herein.

FIG. 5 is a flowchart of an example video recording process 500 in accordance with some embodiments described herein. On a recording device 200, in operation 502, video frame data 254 is received based on the output produced by the executing software component 210 as well as any output shown based on recorder 10 user interface 205 activity, such as positioning of a mouse arrow, keystrokes displayed in a field and the like. In operation 504, while the video frame data is being received, the RUIIAD 240 is also received, based on the recorder's 10 interactions with the software component.

In operation 506, the RUIIAD 240 is associated with the corresponding video frame data 254 to produce the video recording 250 by the VAE 220. In operation 508, the video recording 250 is stored in a non-volatile recording medium 15.

Figure 6:
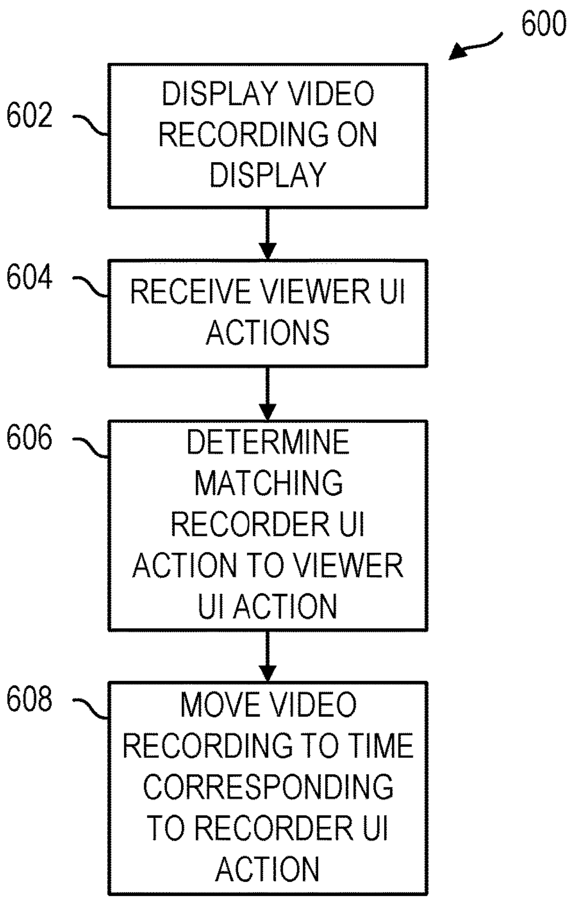
FIG. 6 is a flowchart of an example video viewing process in accordance with some embodiments described herein.

FIG. 6 is a flowchart of an example video viewing process 600 in accordance with some embodiments described herein. On a viewing device 300, in operation 602, a video recording 250 is displayed on a display 308. In operation 604, as the viewer 20 is viewing the video recording 250, the VAE 220 receives viewer UI actions and converts them into VUIIAD 340.

In operation 606, the VAE 220 determines if there is a RUIIAD element $RT_1$ 240$_1$ that matches the VUIIAD element 340$_1$ $VT_1$. If so, in operation 608, the video recording is moved to a time corresponding to the RUIIAD element $RT_1$ 240$_1$ Various embodiments may offer, as a service, a way to cognitively understand and correlate user interactions in the real world on the video with actions within the video, and dynamically re-route viewing to other sections of the video. Various embodiments serve to understand the video rather than merely summarize it, and provide capabilities of self-referencing and learning.

TECHNICAL APPLICATION

The one or more embodiments disclosed herein accordingly provide an improvement to computer technology. For example, an improvement to providing a user interface for training videos displayed on a computer display helps improve the efficiency in operating training videos provided for computer users.

What is claimed is:

1. A computer implemented method for producing, by a recorder, a video recording about a software component, using a recording device, the method comprising using a processor for:

receiving, during a recording operation for training a viewer to operate the software component, video frame data for the video recording of the recorder using a user interface (UI) interacting with the software component;

receiving, during the recording operation, recorder UI actions from a UI of the recording device and converting them to recorder UI input activity data (RUIIAD) based on recorder interactions between the recorder and a display element of the software component;

associating first recorder activity data (FRAD) of the RUIIAD at a FRAD time $RT_1$ with the video frame data of the video recording; and saving the video recording that comprises the video frame data and the RUIIAD to a recording medium.

2. The method of claim 1, wherein the RUIIAD is based on a pointer device input.

3. The method of claim 2, wherein the pointer device input provides X, Y coordinate data on the display and include user action data.

4. The method of claim 3, wherein the user action data is based on an action selected from the group consisting of a mouse click and a touch screen tap.

5. The method of claim 1, wherein the RUIIAD is based on an audio device input.

6. The method of claim 5, wherein the audio device input interprets recorder commands.

7. The method of claim 1, wherein the RUIIAD is based on keystroke input.

8. The method of claim 1, wherein the display element is selected from the group consisting of a dialog box, a menu, a drop-down menu, a list box, a push button, a radio button, and a checkbox.

9. A computer-implemented method for presenting, to a viewer, a video recording about a software component, using a viewing device, the method comprising using a processor for:

displaying, during a viewing operation for training the viewer to operate the software component on a display device, the video recording that comprises: a display element of the software component, and first recorder activity data (FRAD) of recorder user interface (UI) input activity data (RUIIAD) at a FRAD time $RT_1$ with video frame data of the video recording;

receiving, during the displaying, viewer UI actions from a UI of the viewing device and converting them to viewer UI input activity data (VUIIAD) based on viewer interactions between the viewer and the display element of the software component;

determining first viewer activity data (FVAD) of the VUIIAD at a FVAD time $VT_1$ of the video frame that corresponds to the FRAD, wherein the FRAD time $VR_1$ and the FVAD time $VT_1$ differ; and responsive to the determining, moving the video recording from the FVAD time $VT_1$ to the FRAD time $RT_1$.

10. The method of claim 1, wherein the VUIIAD is based on a pointer device input.

11. The method of claim 10, wherein the pointer device input provides X, Y coordinate data on the display and include user action data.

12. The method of claim 11, wherein the user action data is based on an action selected from the group consisting of a mouse click and a touch screen tap.

13. The method of claim 1, wherein the VUIIAD is based on an audio device input.

14. The method of claim 13, wherein the audio device input interprets viewer commands.

15. The method of claim 1, wherein the VUIIAD is based on keystroke input.

16. The method of claim 1, wherein the display element is selected from the group consisting of a dialog box, a menu, a drop-down menu, a list box, a push button, a radio button, and a checkbox.

17. A video recording and displaying system comprising:

a video recording device for producing a video recording, the video recording device comprising a recorder memory and a recording processor configured to read and write to the recorder memory, the recording processor further configured to:

receive, during a recording operation for training a viewer to operate a software component, video frame data for the video recording of the recorder using a user interface (UI) interacting with the software component;

receive, during the recording operation, recorder UI actions from a UI of the recording device and convert them to recorder UI input activity data (RUIIAD) based on recorder interactions between the recorder and a display element of the software component;

associating first recorder activity data (FRAD) of the RUIIAD at a FRAD time $RT_1$ with the video frame data of the video recording; and saving the video recording that comprises the video frame data and the RUIIAD to a recording medium; and a viewing device for presenting, to a viewer, the video recording, the viewing device comprising a viewer memory and a viewer processor configured to read and write to the viewer memory, the viewer processor further configured to:

display, during a viewing operation for training the viewer to operate the software component on a display device, the video recording that comprises: a display element of the software component, and first recorder activity data (FRAD) of recorder user interface (UI) input activity data (RUIIAD) at a FRAD time $RT_1$ with video frame data of the video recording;

receive, during the display, viewer UI actions from a UI of the viewing device and convert them to viewer UI input activity data (VUIIAD) based on viewer interactions between the viewer and the display element of the software component;

determine first viewer activity data (FVAD) of the VUIIAD at a FVAD time $VT_1$ of the video frame that corresponds to the FRAD, wherein the FRAD time $VR_1$ and the FVAD time $VT_1$ differ; and responsive to the determination, move the video recording from the FVAD time $VT_1$ to the FRAD time $RT_1$.

18. The system of claim 17, wherein:

the RUIIAD is based on a pointer device input;

the pointer device input provides X, Y coordinate data on the display and include user action data; and the user action data is based on an action selected from the group consisting of a mouse click and a touch screen tap.

19. The system of claim 17, wherein:

the VUIIAD is based on a pointer device input;

the pointer device input provides X, Y coordinate data on the display and include user action data; and the user action data is based on an action selected from the group consisting of a mouse click and a touch screen tap.

20. The system of claim 17, wherein the display element is selected from the group consisting of a dialog box, a menu, a drop-down menu, a list box, a push button, a radio button, and a checkbox.

* * * * *